US012171309B2

(12) United States Patent
Allison et al.

(10) Patent No.: US 12,171,309 B2
(45) Date of Patent: Dec. 24, 2024

(54) ZIPPER LOCKING DEVICE

(71) Applicants: Brian Allison, West Harrison, NY (US); John Monastero, Stony Brook, NY (US)

(72) Inventors: Brian Allison, West Harrison, NY (US); John Monastero, Stony Brook, NY (US)

( * ) Notice: Subject to any disclaimer, the term of this patent is extended or adjusted under 35 U.S.C. 154(b) by 163 days.

(21) Appl. No.: 17/993,977

(22) Filed: Nov. 24, 2022

(65) Prior Publication Data

US 2023/0157424 A1 May 25, 2023

Related U.S. Application Data

(60) Provisional application No. 63/282,751, filed on Nov. 24, 2021.

(51) Int. Cl.
*E05B 65/52* (2006.01)
*A44B 19/30* (2006.01)

(52) U.S. Cl.
CPC ............ *A44B 19/301* (2013.01); *E05B 65/52* (2013.01)

(58) Field of Classification Search
CPC ...... E05B 65/50; E05B 65/52; E05B 65/5246; E05B 65/5253; E05B 65/5284; A44B 19/301; Y10T 70/5739
USPC ............................................ 70/2–14, 19, 74
See application file for complete search history.

(56) References Cited

U.S. PATENT DOCUMENTS

| | | | | | | |
|---|---|---|---|---|---|---|
| 1,197,020 | A | * | 9/1916 | Farrar | B60R 25/005 | 70/203 |
| 4,085,599 | A | * | 4/1978 | Fischer | E05B 67/383 | 70/14 |
| 4,864,834 | A | * | 9/1989 | Waite | E05B 67/383 | 70/57 |
| 5,020,342 | A | * | 6/1991 | Doan | E05B 67/383 | 292/307 R |
| 5,070,712 | A | * | 12/1991 | Fox | E05B 67/003 | 70/49 |
| 5,167,135 | A | * | 12/1992 | Gobeski | E05B 67/383 | 200/43.15 |
| 5,365,757 | A | * | 11/1994 | Primeau | E05B 67/383 | 292/307 R |

(Continued)

FOREIGN PATENT DOCUMENTS

WO WO-2009143214 A1 * 11/2009 ........... E05B 67/383

*Primary Examiner* — Suzanne L Barrett
(74) *Attorney, Agent, or Firm* — Joseph M. Fowler

(57) ABSTRACT

A zipper locking hasp is described which adapts to most conventional zippers without modification to the zipper or to the movable slider parts of a zipper. The hasp is comprised of a plate component with prongs pivotally joined to a channel component. The plate component is fabricated having narrow prongs designed to fit through the conventional aperture present on most zipper sliders. In normal operation, when a zipper is closed, a pair of sliders is brought together along the zipper chain. When the hasp is open, the prongs formed by the plate are inserted through apertures in adjacent sliders which inhibits movement of each slider relative to one another. When the hasp is closed, holes provided in the plate and channel assembly are aligned. A shackle of a padlock can be inserted through the aligned holes keeping the plate and channel components mated locking the zipper.

3 Claims, 10 Drawing Sheets

110

(56) References Cited

U.S. PATENT DOCUMENTS

| | | | | | |
|---|---|---|---|---|---|
| 5,582,042 | A * | 12/1996 | Mordick | E05B 67/383 | 70/57 |
| 5,743,116 | A * | 4/1998 | Suster | E05B 67/383 | 70/14 |
| 5,881,582 | A * | 3/1999 | Monaco | F16K 35/06 | 70/30 |
| 5,956,980 | A * | 9/1999 | Jenkins, Jr. | F16B 45/035 | 24/598.5 |
| 6,178,790 | B1 * | 1/2001 | Chiarelli | E05C 1/14 | 292/171 |
| 8,353,182 | B2 * | 1/2013 | Triffle | E05B 67/383 | 70/14 |

* cited by examiner

110

110

110

110

ZIPPER LOCKING DEVICE

CROSS-REFERENCE TO RELATED APPLICATIONS

The present application claims the benefit of U.S. Provisional Patent Application No. 63/282,751, filed on Nov. 24, 2021, which is expressly incorporated herein in its entirety by reference thereto.

FIELD OF THE INVENTION

This invention relates to latching and locking devices for zippers and more particularly to zippers commonly used in association with luggage, baggage, and backpacks.

BACKGROUND OF THE INVENTION

The prior art reveals many locking devices for zippers to improve the security of inline zippers commonly found on baggage and, especially, zippers made for soft-sided luggage and backpacks. Many of those locking devices for zippers are adapted to hold the loosely attached pull tabs on the zipper "sliders" or "carriages", A more secure approach uses a mechanical capture technique which limits movement of a zipper slider. In most cases the zipper slider must be modified to accommodate the mechanical mechanism limiting movement of each slider. A combination lock or a key lock may be combined with the mechanism limiting slider movement as the lock is designed to be relatively unobtrusive. Another security approach is to hide or surround the zipper sliders beneath a cover of some sort restricting physical access to the zipper pull tabs.

BRIEF SUMMARY OF THE INVENTION

The current invention is a form of hasp which adapts to most conventional zippers without any modification of the zipper or of the movable slider parts of a zipper. The hasp is comprised of a plate component centrally aligned and pivotally joined to fit within a channel component. The plate component can rotate with respect to the channel component around the pivot. The plate component is fabricated having two narrow prongs which are designed to fit through the conventional loop-shaped apertures present on most zipper sliders. In normal operation, when a zipper is closed, a pair of sliders are brought together along the zipper chain. When the hasp is open, the prongs on the plate can be inserted through the apertures on each slider which inhibits movement of the slider relative to one another. Holes are provided in the plate and channel assembly which are fully aligned when the hasp is closed. A shackle of a padlock, or similar device, inserted through the aligned holes keeps the plate and channel components mated when the lock is closed, fixedly limiting movement of the zipper sliders.

A primary object of the invention is to safeguard the contents of a compartment maintained closed by means of an inline zipper.

An object of the invention is to provide an improved zipper latching device compatible with a wide variety of zippers and padlocks or other retaining devices.

Another object of the invention is to provide a more visibly rugged and effective mechanism to restrict movement of one or more sliders of a zipper that ride along a zipper chain.

DETAILED DESCRIPTION OF THE INVENTION

Zippers are normally comprised of a "tape" which is the name given to the flexible portion of a zipper which is usually fabric or flexible material. The tape is affixed along one border to the backing material and along a parallel border to the zipper "chain". The zipper chain is comprised of a row of teeth which form individual elements of the chain. The toothlike elements intermesh to close the zipper. A "slider", or "carriage", is selectively moved along the chain urging the elements to intermesh closing the zipper or, selectively and oppositely, moved along the chain separating the elements to open the zipper. For definitional clarity, the words contained between quotation marks are commonly used in the zipper industry.

A "pull tab" to facilitate manual movement of the slider is provided on most zippers. The pull tab is loosely connected through an aperture provided as an integral part of the slider. Commonly, a conventional zipper lock is connected to the slider through a hole or opening on the pull tab which is loosely fastened to the slider.

Visible examples of pull tabs are shown vertically oriented in the perspective drawings of the preferred embodiment of the current inventive assemblies 110 shown in FIGS. 8-11.

In the preferred embodiment of the present invention, a latching hasp device is provided with rigid projections—prongs 16—which are inserted through an aperture integral to each zipper slider. This design effectively prevents movement of the sliders and is more secure than connections to loosely attached zipper pull tabs.

Figure 1:
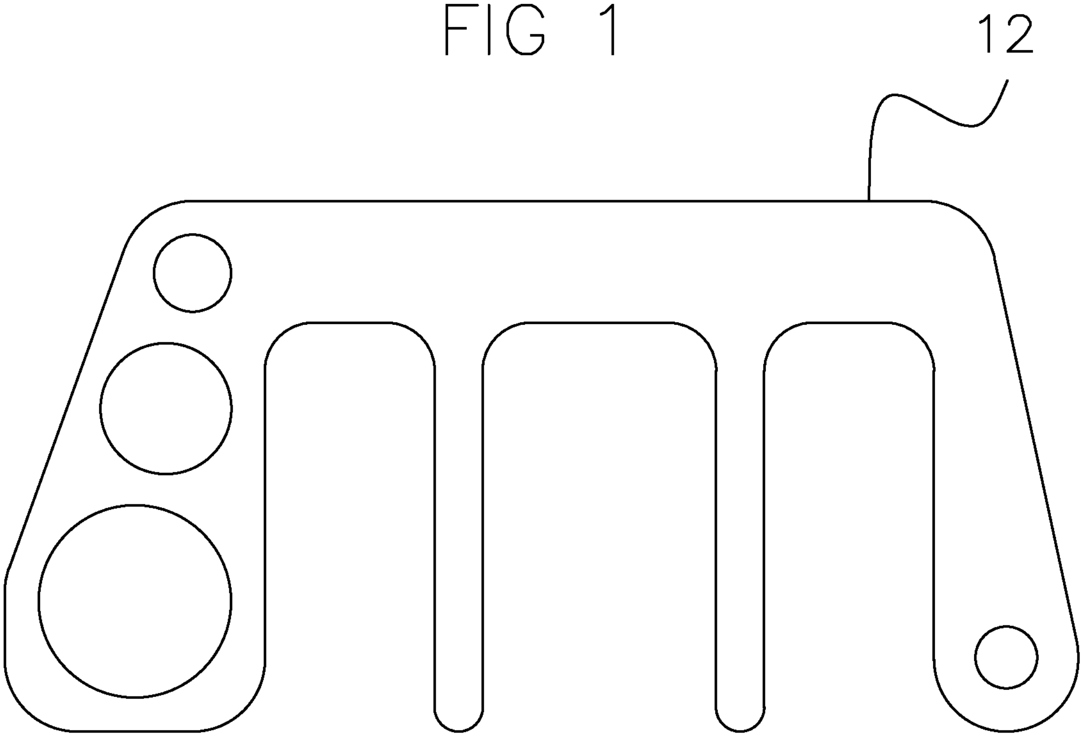
FIG. 1 depicts a side elevation of plate component 12 of the current invention.
Figure 2:
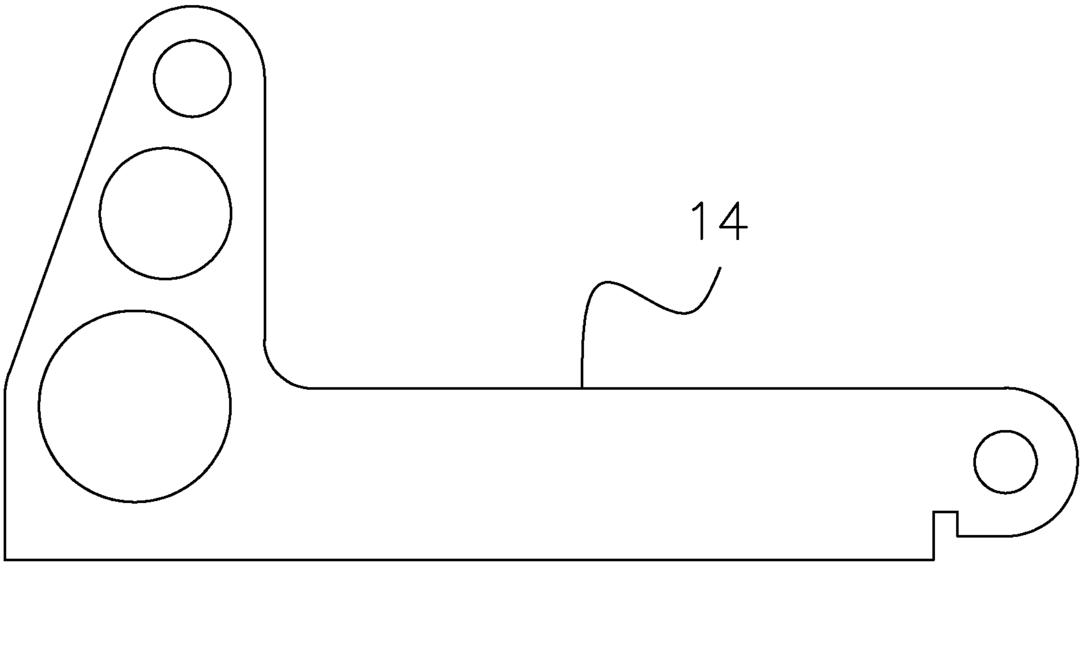
FIG. 2 depicts a side elevation of channel component 14 of the current invention.
Figure 3:
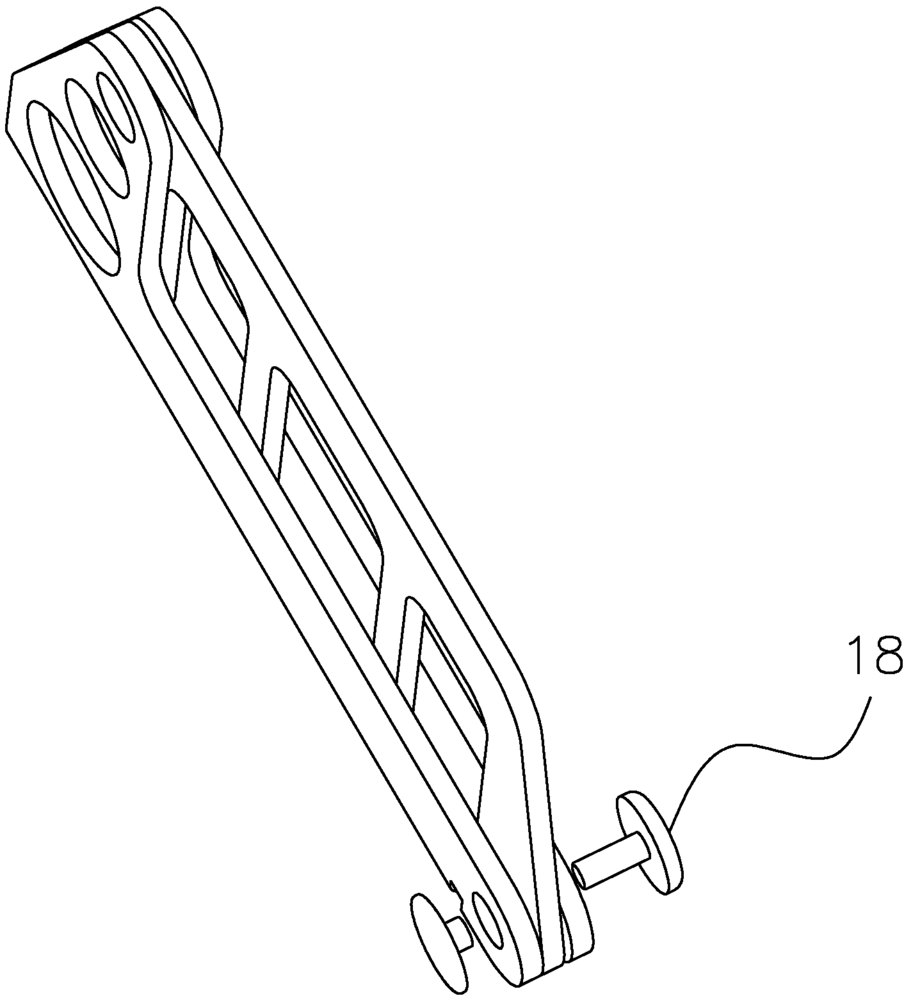
FIG. 3, in a perspective view, depicts plate component 12 in FIG. 1 positioned within the channel component 14 shown in FIG. 2 and a pivot component fastener 18 used to join the plate and channel components.
Figure 4:
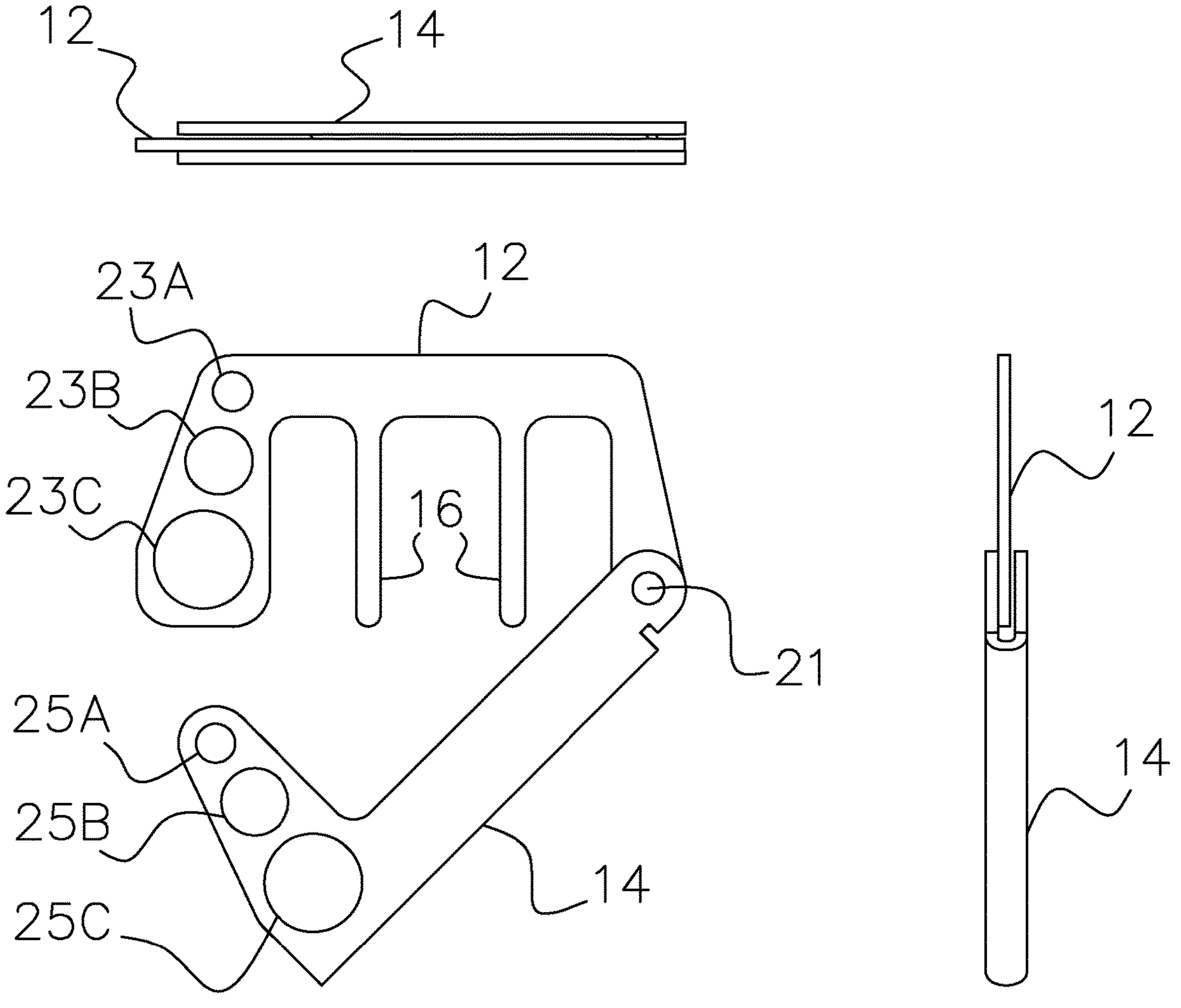
FIG. 4 is a side elevation of plate 12 and channel 14 components of the current invention 110 shown in relation to one another in an "open" configuration (with the pivot fastener 18 absent).
Figure 5:
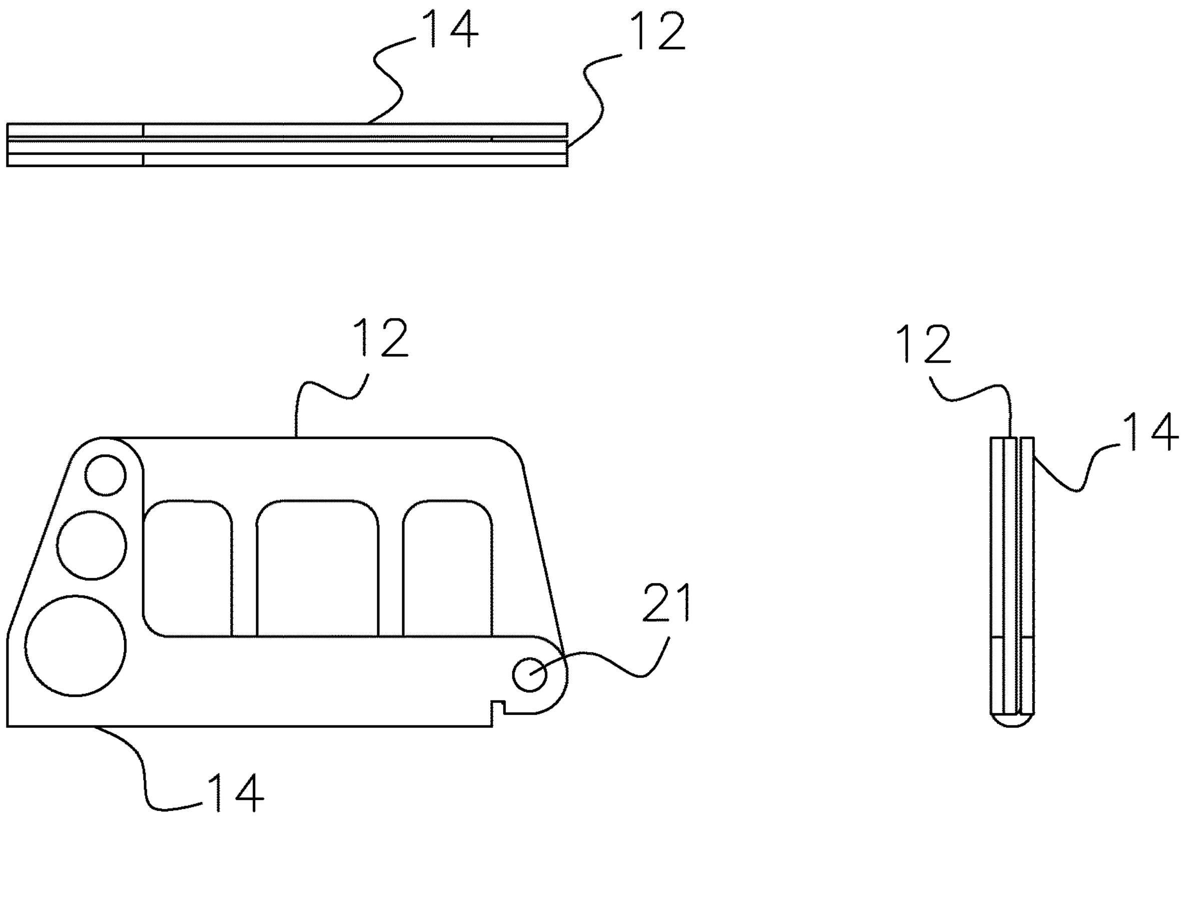
FIG. 5 is a side elevation of plate 12 and channel 14 components of the current invention 110 in a "closed" configuration (with the pivot fastener 18 absent).
Figure 6:
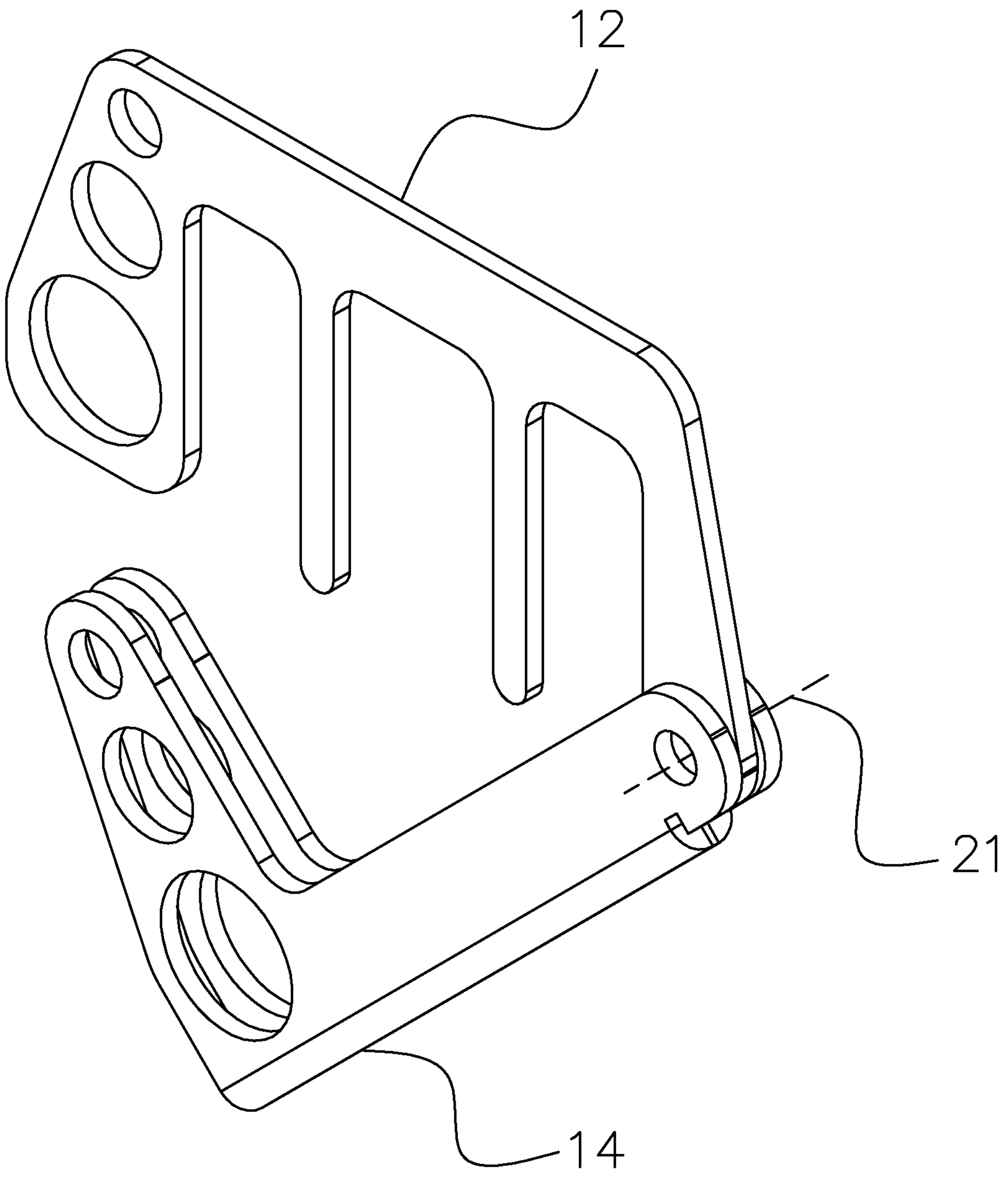
FIG. 6 is a perspective view of the plate and channel components relative to one another of the current invention 110 showing the pivot axis in an "open" jaw configuration (with the pivot fastener 18 absent).
Figure 7:
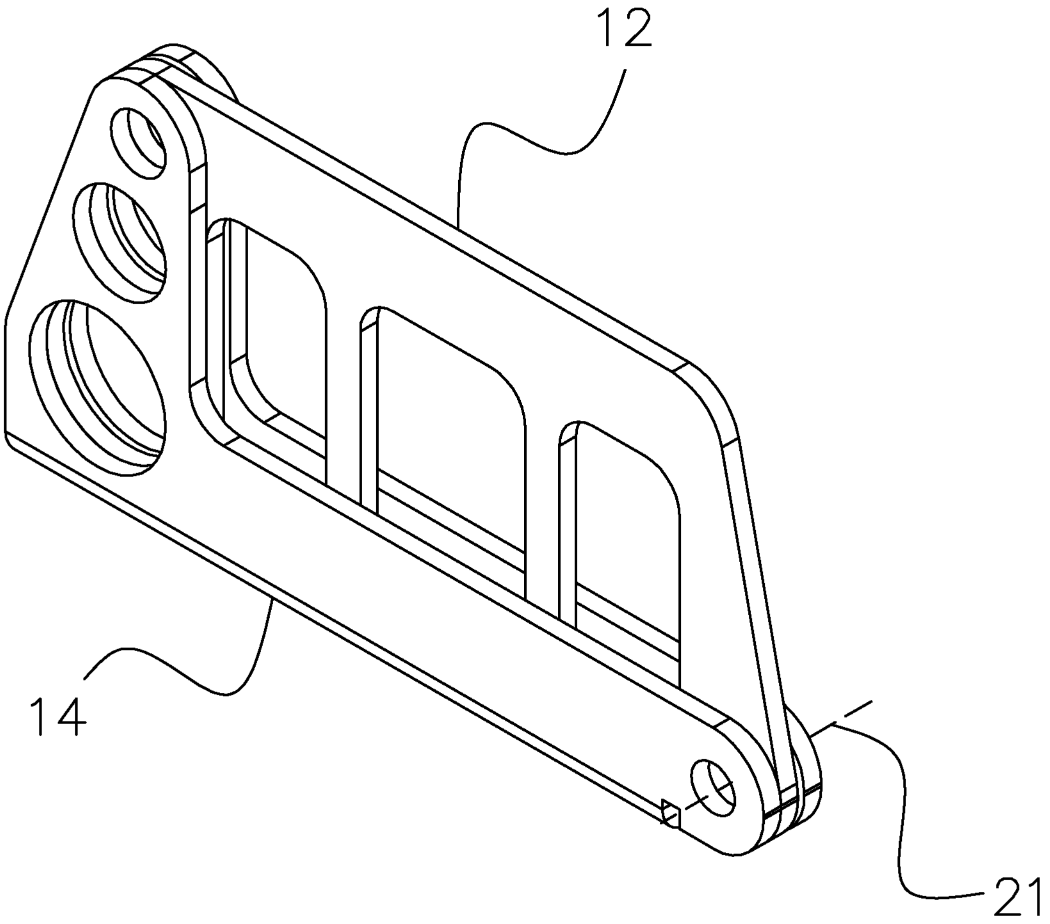
FIG. 7 is a perspective view of the plate and channel components of the current invention 110 in a "closed" jaw configuration without pivot fastener 18.
Figure 8:
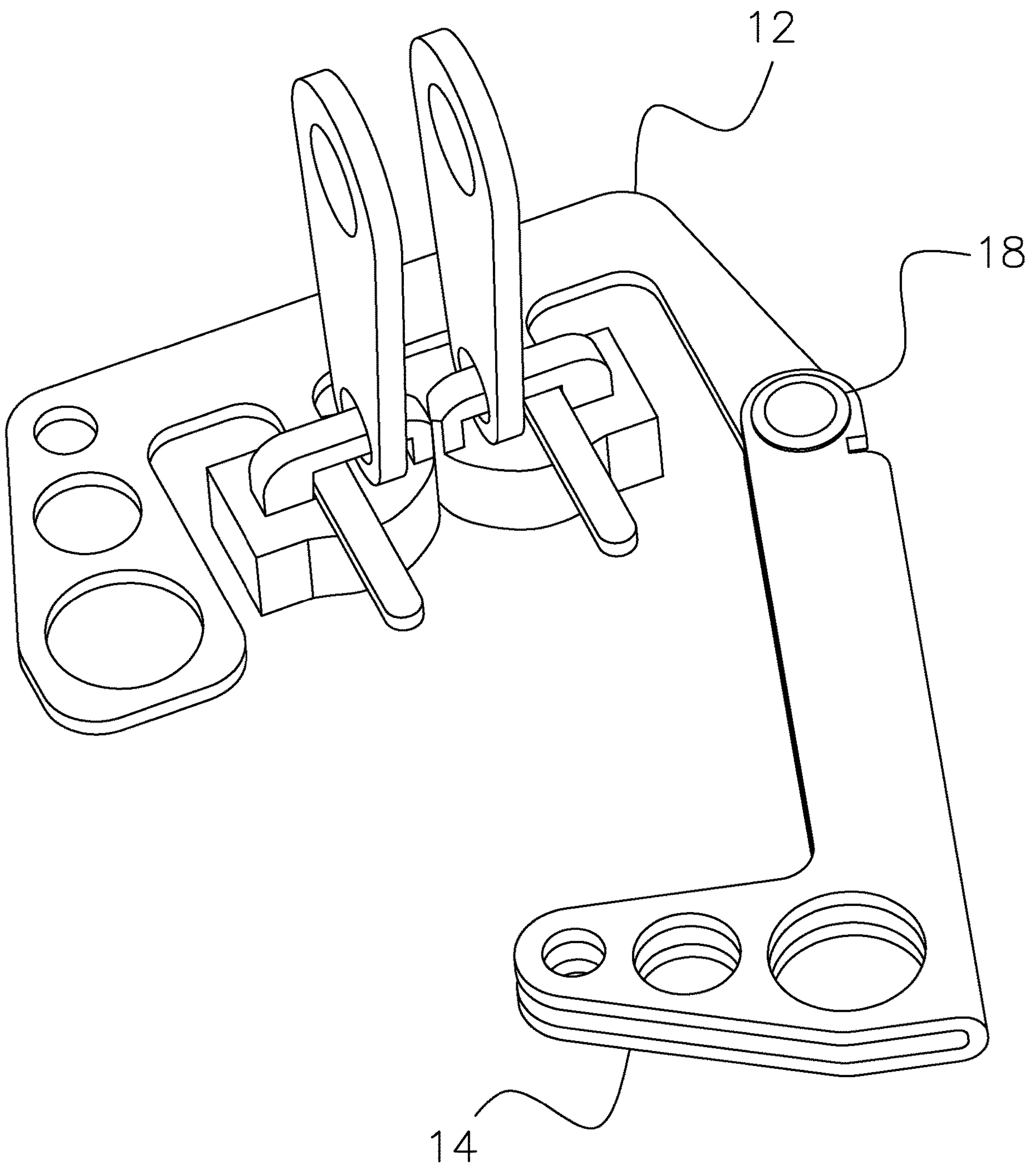
FIG. 8 is a perspective depiction of the assembled zipper latching hasp in an "open" condition showing the component prongs penetrating a pair of apertures on the zipper chain sliders (interlocking elements of the zipper chain normally adjacent to the zipper sliders not shown).

With reference to FIGS. 1-7 of the Drawing, a preferred embodiment of the zipper latching device is comprised of plate component 12 shown in FIG. 1, and channel component 14, shown in FIG. 2.

In FIGS. 4-7 the components 12,14 are combined and shown pivotally oriented and rotatable around pivot axis 21. The pivot axis 21 extends perpendicular to plate 12 through the hole near a corner of plate 12. Pivot fastener 18 holds components 12 and 14 together keeping component 12 contained within channel 14. When plate component 12 is rotated in the direction of the open channel component 14 it is received within the channel without interference from the surfaces, upright walls or flanges defining channel 14.

The plate 12 fastened to channel component 14 by fastener 18 is rotatable around pivot axis 21 and each prong 16 is dimensionally adapted for insertion through a wide variety of apertures in zipper sliders.

In a typical application, a pair of zipper sliders are brought together from opposing directions to close a zipper chain. Plate component 12 is rotated away from channel component 14 permitting access to the narrow distal ends of prongs 16. Prongs 16 are then inserted through the aperture on each slider. Subsequently, channel component 14 is rotated until the interior floor of channel 14 engages the plate component prongs 16 preventing further rotation and the hasp component jaws are fully closed.

Figure 9:
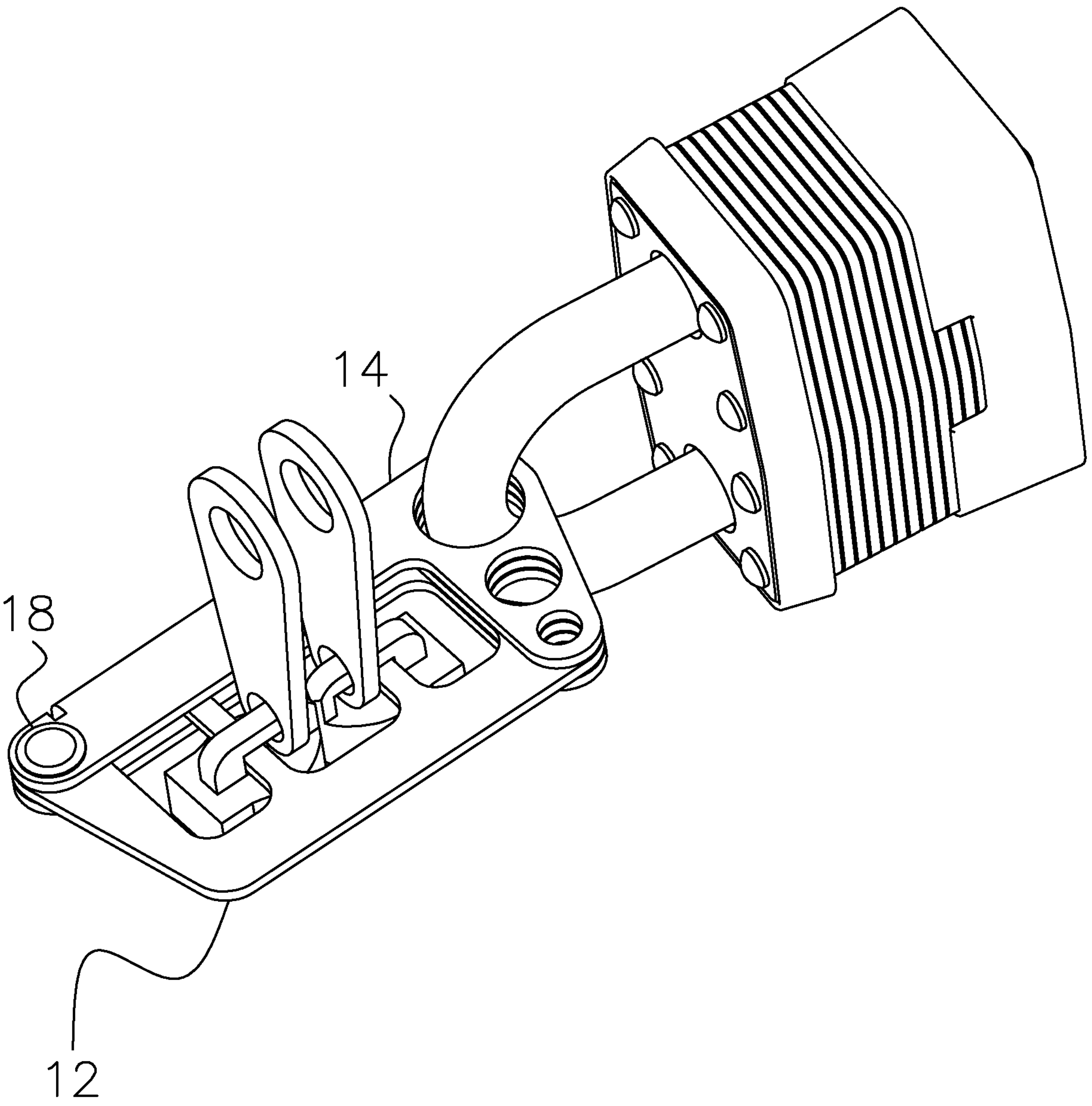
FIG. 9 is a depiction of the zipper latching invention 110 in a closed and locked condition with an external padlock of rugged construction requiring the largest hole to accommodate the shackle component of the padlock.
Figure 10:
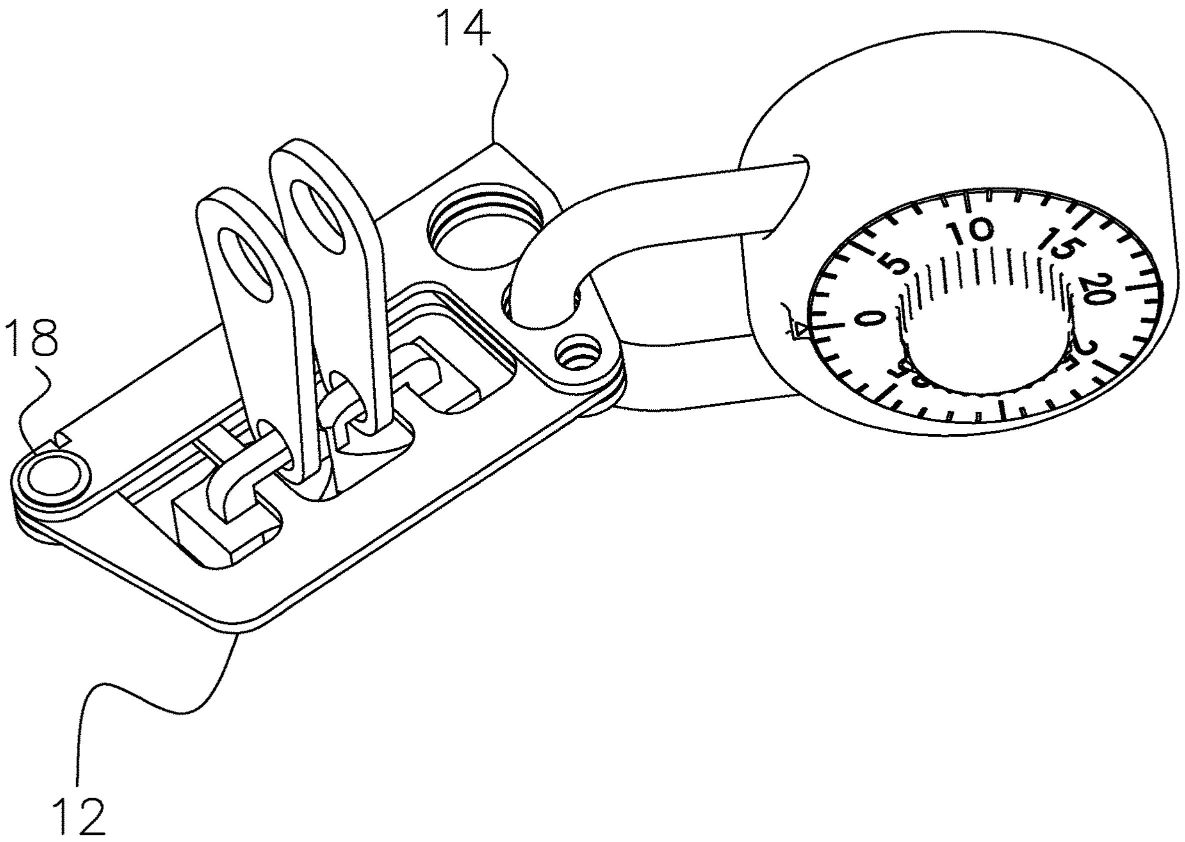
FIG. 10 is a depiction of the zipper latching invention 110 in a closed and locked condition with an external padlock of rugged construction requiring the mid-size hole to accommodate the shackle component of the padlock.
Figure 11:
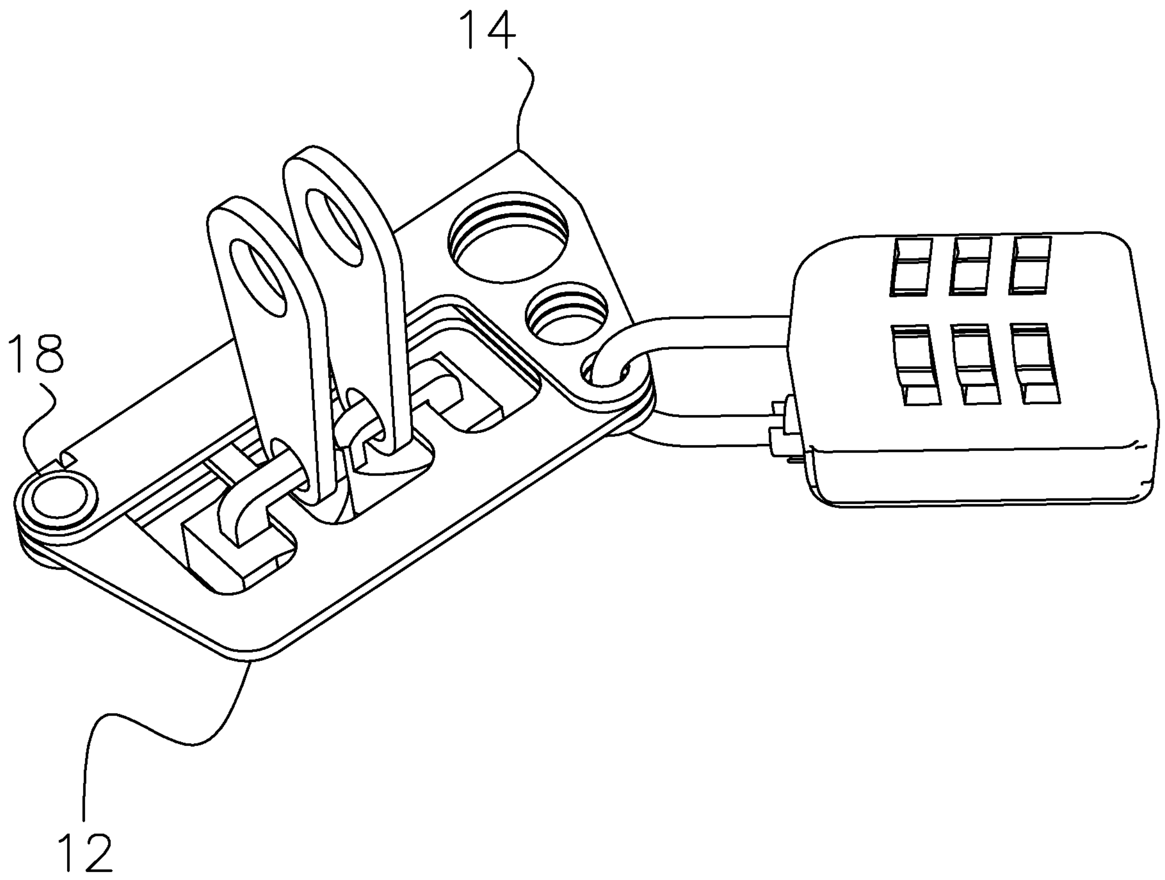
FIG. 11 is a depiction of the zipper latching invention 110 in a closed and locked condition with an external ISA style padlock using the smallest diameter hole to accommodate the shackle component of the combination padlock.

The shackle of a padlock, such as those shown in FIG. 9, 10 or 11, can then be selectively inserted through holes 23A, 23B or 23C, and through holes 25A, 25B or 25C, as each hole is aligned through both components of the zipper hasp 110 when the pivotally connected plate component jaw is fully closed. Zipper security is positively established when the padlock is locked.

This embodiment of the zipper latch 110 as shown is fabricated from 1/16" thick stainless steel sheet material for toughness and rust resistance. The size, composition and configuration reinforce the impression that this is an effective security enhancement.

The zipper latch device is designed to be readily portable and pocketable. When the jaw is closed, the device approximates the size of a standard credit card. The embodiment shown in the FIGS. is 2.79" (71 mm) wide and 1.44" (37 mm) tall and 1.87" (4.76 mm) thick.

In another embodiment (not shown) the pivoted jaw components are mechanically attracted to one another when the jaws are nearly fully closed. This is readily accomplished magnetically by placing a permanent magnet within the channel component in the vicinity of the prongs. In this embodiment the material used to make the components is to some degree ferromagnetic, e.g. 400 series stainless steel or equivalent. Alternatively, spring biasing movement of the components toward closure can be provided. Magnetic attraction or spring biasing of the components keeps the zipper latching device jaws closed and confined to its smallest area dimension when not in service.

While the invention has been specifically described in connection with the embodiments illustrated in the drawings, it is understood that these are for illustration and not limitation and that modifications are possible without departing from the scope of the invention as described and presently disclosed.

We claim:

1. A zipper locking device comprising:

a selected padlock;

a pair of conventional zipper sliders brought together along a zipper chain, each zipper slider having an aperture;

a portable hasp comprising a flat plate component having two narrow prongs and a plurality of round holes of different diameters and a channel component having a plurality of round holes equal in size to the round holes in the plate component and a floor;

the plate component and channel components are combined, aligned and pivotally joined at one end such that the plate component fits within the channel component;

wherein the plate component is rotatable away from the channel component allowing insertion of the two narrow prongs of the plate component through the aperture integral to each zipper slider inhibiting movement of each slider relative to one another;

subsequently, the channel component is rotatable into engagement with the narrow distal ends of prongs against the floor of the channel component closing the hasp and bringing the pluralities of round holes into full alignment ready to receive the shackle of the selected padlock.

2. A zipper locking device as described in claim 1 in which the plurality of round holes of different diameters in the plate and channel components are three (3) in number.

3. A zipper locking device as described in claim 2 that is portable and fabricated from stainless steel into a pocket credit card size, 2.79" (71 mm) wide, 1.44" (37 mm) tall and 1.87" (4.7 mm) thick.

* * * * *